United States Patent
Li et al.

(10) Patent No.: US 10,045,323 B2
(45) Date of Patent: Aug. 7, 2018

(54) POSITIONING METHOD, NETWORK SIDE DEVICE, POSITIONING NODE, AND POSITIONING SYSTEM

(71) Applicant: Huawei Technologies Co., Ltd., Shenzhen (CN)

(72) Inventors: Yang Li, Beijing (CN); Jun Cheng, Beijing (CN); Sha Ma, Beijing (CN); Gaoke Du, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/363,842

(22) Filed: Nov. 29, 2016

(65) Prior Publication Data

US 2017/0079006 A1    Mar. 16, 2017

Related U.S. Application Data

(63) Continuation of application No. PCT/CN2014/078890, filed on May 30, 2014.

(51) Int. Cl.
*H04W 24/00* (2009.01)
*H04W 64/00* (2009.01)
(Continued)

(52) U.S. Cl.
CPC .......... *H04W 64/00* (2013.01); *H04L 5/0048* (2013.01); *H04W 72/0473* (2013.01); *H04W 88/02* (2013.01)

(58) Field of Classification Search
CPC .............................. G01S 5/0205; H04W 64/00
(Continued)

(56) References Cited

U.S. PATENT DOCUMENTS 9,426,621 B2 * 8/2016 Venkatraman .......... H04W 4/90
2008/0261623 A1 10/2008 Etemad et al.
(Continued)

FOREIGN PATENT DOCUMENTS

CN    102970748 A    3/2013
CN    103179662 A    6/2013
(Continued)

OTHER PUBLICATIONS

Extended European Search Report dated May 11, 2017 in Patent Application No. 14893456.5.
(Continued)

*Primary Examiner* — William D Cumming
(74) *Attorney, Agent, or Firm* — Oblon, McClelland, Maier & Neustadt, L.L.P.

(57) ABSTRACT

This application provides a positioning method, a network side device, a positioning node, and a positioning system, where the method includes: receiving, by a network side device, a positioning request, where the positioning request is used to trigger positioning for UE; sending configuration information to N positioning nodes according to the positioning request, receiving, by the N positioning nodes according to the configuration information, the uplink positioning reference signal sent by the UE, and obtaining N measurement results according to the uplink positioning reference signal; sending, by M positioning nodes of the N positioning nodes, M measurement results corresponding to the M positioning nodes to the network side device; and determining, by the network side device, a position of UE according to the M measurement results.

12 Claims, 7 Drawing Sheets

(51) Int. Cl.
*H04L 5/00* (2006.01)
*H04W 72/04* (2009.01)
*H04W 88/02* (2009.01)

(58) Field of Classification Search
USPC ...................................................... 455/456.1
See application file for complete search history.

(56) References Cited

U.S. PATENT DOCUMENTS

| | | | |
|---|---|---|---|
| 2010/0039929 A1 | 2/2010 | Cho et al. | |
| 2013/0294265 A1 | 11/2013 | Peng et al. | |
| 2015/0215793 A1* | 7/2015 | Siomina | G01S 5/0205 455/456.1 |
| 2015/0245176 A1* | 8/2015 | Venkatraman | H04W 4/90 455/456.1 |
| 2017/0079006 A1* | 3/2017 | Li | H04W 64/00 |
| 2017/0347332 A1* | 11/2017 | Cui | H04W 64/00 |

FOREIGN PATENT DOCUMENTS

| | | |
|---|---|---|
| JP | 10-257546 A | 9/1998 |
| JP | 2001-313972 A | 11/2001 |
| JP | 2012-524906 A | 10/2012 |
| JP | 2015-531054 A | 10/2015 |
| WO | WO 2014/064656 A3 | 5/2014 |

OTHER PUBLICATIONS

3GPP TS 25.305 V11.0.0, "3rd Generation Partnership Project; Technical Specification Group Radio Access Network; Stage 2 functional specification of User Equipment (UE) positioning in UTRAN, (Release 11)", 3GPP Draft, XP50905644, Sep. 17, 2012, 80 pages.

Office Action dated Jan. 15, 2018 in European Patent Application No. 14 893 456.5.

Office Action dated Apr. 3, 2018 in Japanese Patent Application No. 2017-514747 (with English language translation), 7 pages.

* cited by examiner

POSITIONING METHOD, NETWORK SIDE DEVICE, POSITIONING NODE, AND POSITIONING SYSTEM

CROSS-REFERENCE TO RELATED APPLICATIONS

This application is a continuation of International Application No. PCT/CN2014/078890, filed on May 30, 2014, the disclosure of which is hereby incorporated by reference in its entirety.

TECHNICAL FIELD

This application relates to the communications technology field, and in particular, to a positioning method, a network side device, a positioning node, and a positioning system.

BACKGROUND

With development of mobile communications technologies and popularization of intelligent terminals, mobile network services are becoming increasingly rich, which makes a more convenient life for people. A positioning service is widely used in transportation navigation, geographical position searching, position information sharing, and the like. People spend most of their time indoors, and 80% of phone calls and data access services also happen indoors. Therefore, indoor positioning applications gradually become hotspot requirements and have abundant services, for example, position navigation inside an airport or a shopping mall, room searching in a large office building, parking space searching, position searching of a shop or a person in a downtown area, and shopping navigation inside a supermarket. These applications require higher positioning precision, for example, a positioning error less than five meters even within one meter, to achieve good user experience.

Conventional positioning services are mainly classified into two types: Global Positioning System (GPS) positioning and mobile cellular network positioning deployed by an operator. A principle of the GPS positioning is as follows: A user terminal calculates distances from the user to satellites by using a detected arrival sequence and time difference of signals simultaneously sent by multiple positioning satellites, usually more than four satellites, and further obtains longitude, latitude, and an elevation of the user according to point locations of the satellites. The GPS positioning may achieve precision within ten meters outdoors, and meets a requirement of an outdoor positioning service; however, the GPS positioning cannot work normally indoors because signals are obstructed. When positioning is performed by using a mobile cellular network, a position range of the user can be preliminarily determined according to a base station position of a cellular cell in which the user is located, and a smaller coverage radius of the cell leads to higher position precision. Further, a time difference of arrival (UTDOA) may be obtained by measuring a distance and an angle of arrival (AoA) between the user and a base station, or by means of combination measurement of multiple cells, so as to calculate a positioning result of higher precision. At present, an outdoor positioning precision goal that can be achieved by a Universal Mobile Telecommunications System (UMTS) or a Long Term Evolution (LTE) system designed by using a 3rd Generation Partnership Project (3GPP) standard is as follows: 67% of positioning errors are less than 50 m, and 95% of the positioning errors are less than 150 m. It can be learned that, outdoor positioning precision obtained by using the conventional GPS and macro cellular network is relatively low and is far from meeting a requirement of indoor positioning precision.

SUMMARY

This application provides a positioning method, a network side device, a positioning node, and a positioning system, which are used to resolve a technical problem of low positioning precision in the prior art.

A first aspect of this application provides a network side device, including:

a receiving unit, configured to receive a positioning request, where the positioning request is used to trigger positioning for user equipment UE, and the UE is located within a device coverage area of the network side device;

a sending unit, configured to send configuration information to N positioning nodes after the receiving unit receives the positioning request, where the configuration information is used to indicate information about the UE and/or information about an uplink positioning reference signal sent by the UE, the N positioning nodes are located within the device coverage area, and a node coverage area of each positioning node is a part of the device coverage area, where N is a positive integer greater than 1;

the receiving unit is further configured to receive M measurement results sent by M positioning nodes of the N positioning nodes, where the M measurement results are obtained by the M positioning nodes according to the uplink positioning reference signal sent by the UE, the uplink positioning reference signal is received by the M positioning nodes according to the configuration information, and M is a positive integer less than or equal to N; and a processing unit, configured to determine a position of the UE according to the M measurement results.

With reference to the first aspect, in a first possible implementation manner of the first aspect, the positioning request is sent by the UE, or sent by another network side device; and the sending unit is further configured to send the determined position to the UE or the another network side device.

With reference to the first aspect or the first possible implementation manner of the first aspect, in a second possible implementation manner of the first aspect, the processing unit is specifically configured to determine an overlapping area of the node coverage areas of the M positioning nodes as the position of the UE when the M measurement results are specifically results indicating that the UE is located within node coverage areas of the M positioning nodes, and when M is greater than 1; or determine the node coverage area of the M positioning node as the position of the UE when M is equal to 1.

With reference to the first aspect or the first possible implementation manner of the first aspect, in a third possible implementation manner of the first aspect, the processing unit is specifically configured to determine the position of the UE by calculating distances from the UE to the M positioning nodes according to M received signal powers, when the M measurement results are specifically received signal powers of the uplink positioning reference signal; or determine a node coverage area of a positioning node corresponding to a highest received signal power as the position of the UE, when the measurement results are specifically received signal powers of the uplink positioning reference signal.

With reference to the third possible implementation manner of the first aspect, in a fourth possible implementation manner of the first aspect, the processing unit is specifically configured to determine a circular area as the position of the UE, where a center of the circular area is a position of a positioning node corresponding to a minimum distance, and a radius of the circular area is the minimum distance.

With reference to any one of the first aspect or the first possible implementation manner of the first aspect to the fourth possible implementation manner of the first aspect, in a fifth possible implementation manner of the first aspect, the configuration information includes an identifier of the UE and/or transmission configuration of the uplink positioning reference signal sent by the UE.

With reference to any one of the first aspect or the first possible implementation manner of the first aspect to the fifth possible implementation manner of the first aspect, in a sixth possible implementation manner of the first aspect, the uplink positioning reference signal is specifically one or any combination of the following:

a service channel or control channel signal sent by the UE to the network side device;

a reference signal used for measurement or channel estimation and sent by the UE to the network side device; and a specially defined uplink positioning reference signal used for detection by the positioning node.

A second aspect of this application provides a network side device, including:

a receiver, configured to receive a positioning request, where the positioning request is used to trigger positioning for user equipment UE, and the UE is located within a device coverage area of the network side device;

a transmitter, configured to send configuration information to N positioning nodes after the receiver receives the positioning request, where the configuration information is used to indicate information about the UE and/or information about an uplink positioning reference signal sent by the UE, the N positioning nodes are located within the device coverage area, and a node coverage area of each positioning node is a part of the device coverage area, where N is a positive integer greater than 1;

the receiver is further configured to receive M measurement results sent by M positioning nodes of the N positioning nodes, where the M measurement results are obtained by the M positioning nodes according to the uplink positioning reference signal sent by the UE, the uplink positioning reference signal is received by the M positioning nodes according to the configuration information, and M is a positive integer less than or equal to N; and a processor, configured to determine a position of the UE according to the M measurement results.

With reference to the second aspect, in a first possible implementation manner of the second aspect, the positioning request is sent by the UE, or sent by another network side device; and the transmitter is further configured to send the determined position to the UE or the another network side device.

With reference to the second aspect or the first possible implementation manner of the second aspect, in a second possible implementation manner of the second aspect, the processor is specifically configured to determine an overlapping area of the node coverage areas of the M positioning nodes as the position of the UE when the M measurement results are specifically results indicating that the UE is located within node coverage areas of the M positioning nodes, and when M is greater than 1; or determine the node coverage area of the M positioning node as the position of the UE when M is equal to 1.

With reference to the second aspect or the first possible implementation manner of the second aspect, in a third possible implementation manner of the second aspect, the processor is specifically configured to: when the M measurement results are specifically received signal powers of the uplink positioning reference signal, determine the position of the UE by calculating distances from the UE to the M positioning nodes according to M received signal powers; or determine a node coverage area of a positioning node corresponding to a highest received signal power as the position of the UE.

With reference to the third possible implementation manner of the second aspect, in a fourth possible implementation manner of the second aspect, the processor is specifically configured to determine a circular area as the position of the UE, where a center of the circular area is a position of a positioning node corresponding to a minimum distance, and a radius of the circular area is the minimum distance.

With reference to any one of the second aspect or the first possible implementation manner of the second aspect to the fourth possible implementation manner of the second aspect, in a fifth possible implementation manner of the second aspect, the configuration information includes an identifier of the UE and/or transmission configuration of the uplink positioning reference signal sent by the UE.

With reference to any one of the second aspect or the first possible implementation manner of the second aspect to the fifth possible implementation manner of the second aspect, in a sixth possible implementation manner of the second aspect, the uplink positioning reference signal is specifically one or any combination of the following:

a service channel or control channel signal sent by the UE to the network side device;

a reference signal used for measurement or channel estimation and sent by the UE to the network side device; and a specially defined uplink positioning reference signal used for detection by the positioning node.

A third aspect of this application provides a positioning node, including:

a receiving unit, configured to receive configuration information sent by a network side device, where the configuration information is used to indicate information about user equipment UE and/or information about an uplink positioning reference signal sent by the UE, the positioning node is located within a device coverage area of the network side device, and a node coverage area of the positioning node is a part of the device coverage area;

the receiving unit is further configured to receive, according to the configuration information, the uplink positioning reference signal sent by the UE, where the UE is located within the device coverage area;

a processing unit, configured to obtain a measurement result according to the uplink positioning reference information; and a sending unit, configured to send the measurement result to the network side device, so that the network side device can determine a position of the UE according to the measurement result.

With reference to the third aspect, in a first possible implementation manner of the third aspect, the measurement result is specifically a result indicating that the UE is located within the node coverage area of the positioning node; or the measurement result is a received signal power of the uplink positioning reference signal.

With reference to the third aspect or the first possible implementation manner of the third aspect, in a second possible implementation manner of the third aspect, the configuration information includes an identifier of the UE and/or transmission configuration of the uplink positioning reference signal sent by the UE.

With reference to the third aspect or the first possible implementation manner of the third aspect or the second possible implementation manner of the third aspect, in a third possible implementation manner of the third aspect, the positioning node is specifically a particular machine to machine M2M terminal, or the positioning node is specifically a terminal that supports a device to device D2D communications function.

With reference to any one of the third aspect or the first possible implementation manner of the third aspect to the third possible implementation manner of the third aspect, in a fourth possible implementation manner of the third aspect, the uplink positioning reference signal is specifically one or any combination of the following:

a service channel or control channel signal sent by the UE to the network side device;

a reference signal used for measurement or channel estimation and sent by the UE to the network side device; and a specially defined uplink positioning reference signal used for detection by the positioning node.

A fourth aspect of this application provides a positioning node, including:

a receiver, configured to receive configuration information sent by a network side device, where the configuration information is used to indicate information about user equipment UE and/or information about an uplink positioning reference signal sent by the UE, the positioning node is located within a device coverage area of the network side device, and a node coverage area of the positioning node is a part of the device coverage area;

the receiver is further configured to receive, according to the configuration information, the uplink positioning reference signal sent by the UE, where the UE is located within the device coverage area;

a processor, configured to obtain a measurement result according to the uplink positioning reference information; and a transmitter, configured to send the measurement result to the network side device, so that the network side device can determine a position of the UE according to the measurement result.

With reference to the fourth aspect, in a first possible implementation manner of the fourth aspect, the measurement result is specifically a result indicating that the UE is located within the node coverage area of the positioning node; or the measurement result is a received signal power of the uplink positioning reference signal.

With reference to the fourth aspect or the first possible implementation manner of the fourth aspect, in a second possible implementation manner of the fourth aspect, the configuration information includes an identifier of the UE and/or transmission configuration of the uplink positioning reference signal sent by the UE.

With reference to the fourth aspect or the first possible implementation manner of the fourth aspect or the second possible implementation manner of the fourth aspect, in a third possible implementation manner of the fourth aspect, the positioning node is specifically a particular machine to machine M2M terminal, or the positioning node is specifically a terminal that supports a device to device D2D communications function.

With reference to any one of the fourth aspect or the first possible implementation manner of the fourth aspect to the third possible implementation manner of the fourth aspect, in a fourth possible implementation manner of the fourth aspect, the uplink positioning reference signal is specifically one or any combination of the following:

a service channel or control channel signal sent by the UE to the network side device;

a reference signal used for measurement or channel estimation and sent by the UE to the network side device; and a specially defined uplink positioning reference signal used for detection by the positioning node.

A fifth aspect of this application provides a positioning system, including:

a network side device, configured to receive a positioning request, where the positioning request is used to trigger positioning for user equipment UE; and send configuration information to N positioning nodes according to the positioning request, where the configuration information is used to indicate information about the UE and/or information about an uplink positioning reference signal sent by the UE, the UE is located within a device coverage area of the network side device, the N positioning nodes are located within the device coverage area, and a node coverage area of each positioning node is a part of the device coverage area, where N is a positive integer greater than 1; and the N positioning nodes, configured to receive, according to the configuration information, the uplink positioning reference signal sent by the UE; and obtain N measurement results according to the uplink positioning reference signal, where M positioning nodes of the N positioning nodes send M measurement results corresponding to the M positioning nodes to the network side device, and M is a positive integer less than or equal to N;

the network side device is configured to determine a position of the UE according to the M measurement results.

A sixth aspect of this application provides a positioning method, including:

receiving, by a network side device, a positioning request, where the positioning request is used to trigger positioning for user equipment UE, and the UE is located within a device coverage area of the network side device;

sending, by the network side device, configuration information to N positioning nodes according to the positioning request, where the configuration information is used to indicate information about the UE and/or information about an uplink positioning reference signal sent by the UE, the N positioning nodes are located within the device coverage area, and a node coverage area of each positioning node is a part of the device coverage area, where N is a positive integer greater than 1;

receiving, by the network side device, M measurement results sent by M positioning nodes of the N positioning nodes, where the M measurement results are obtained by the M positioning nodes according to the uplink positioning reference signal sent by the UE, the uplink positioning reference signal is received by the M positioning nodes according to the configuration information, and M is a positive integer less than or equal to N; and determining, by the network side device, a position of the UE according to the M measurement results.

With reference to the sixth aspect, in a first possible implementation manner of the sixth aspect, the positioning request is sent by the UE, or sent by another network side device, and the method further includes:

sending, by the network side device, a determined position to the UE or the another network side device.

With reference to the sixth aspect or the first possible implementation manner of the sixth aspect, in a second possible implementation manner of the sixth aspect, when the M measurement results are specifically results indicating that the UE is located within node coverage areas of the M positioning nodes, the determining, by the network side device, a position of the UE according to the M measurement results is specifically:

when M is greater than 1, determining an overlapping area of the node coverage areas of the M positioning nodes as the position of the UE; or when M is equal to 1, determining the node coverage area of the M positioning node as the position of the UE.

With reference to the sixth aspect or the first possible implementation manner of the sixth aspect, in a third possible implementation manner of the sixth aspect, when the M measurement results are specifically received signal powers of the uplink positioning reference signal, the determining, by the network side device, a position of the UE according to the M measurement results is specifically:

determining the position of the UE by calculating distances from the UE to the M positioning nodes according to M received signal powers; or determining a node coverage area of a positioning node corresponding to a highest received signal power as the position of the UE.

With reference to the third possible implementation manner of the sixth aspect, in a fourth possible implementation manner of the sixth aspect, the determining the position of the UE by calculating distances from the UE to the M positioning nodes according to M received signal powers is specifically:

determining a circular area as the position of the UE by calculating the distances from the UE to the M positioning nodes according to the M received signal powers, where a center of the circular area is a position of a positioning node corresponding to a minimum distance, and a radius of the circular area is the minimum distance.

With reference to any one of the sixth aspect or the first possible implementation manner of the sixth aspect to the fourth possible implementation manner of the sixth aspect, in a fifth possible implementation manner of the sixth aspect, the configuration information includes an identifier of the UE and/or transmission configuration of the uplink positioning reference signal sent by the UE.

With reference to any one of the sixth aspect or the first possible implementation manner of the sixth aspect to the fifth possible implementation manner of the sixth aspect, in a sixth possible implementation manner of the sixth aspect, the uplink positioning reference signal is specifically one or any combination of the following:

a service channel or control channel signal sent by the UE to the network side device;

a reference signal used for measurement or channel estimation and sent by the UE to the network side device; and a specially defined uplink positioning reference signal used for detection by the positioning node.

A seventh aspect of this application provides a positioning method, including:

receiving, by a positioning node, configuration information sent by a network side device, where the configuration information is used to indicate information about user equipment UE and/or information about an uplink positioning reference signal sent by the UE, the positioning node is located within a device coverage area of the network side device, and a node coverage area of the positioning node is a part of the device coverage area;

receiving, by the positioning node according to the configuration information, the uplink positioning reference signal sent by the UE, where the UE is located within the device coverage area;

obtaining, by the positioning node, a measurement result according to the uplink positioning reference information; and sending, by the positioning node, the measurement result to the network side device, so that the network side device can determine a position of the UE according to the measurement result.

With reference to the seventh aspect, in a first possible implementation manner of the seventh aspect, the measurement result is specifically a result indicating that the UE is located within the node coverage area of the positioning node; or the measurement result is a received signal power of the uplink positioning reference signal.

With reference to the seventh aspect or the first possible implementation manner of the seventh aspect, in a second possible implementation manner of the seventh aspect, the configuration information includes an identifier of the UE and/or transmission configuration of the uplink positioning reference signal sent by the UE.

With reference to the seventh aspect or the first possible implementation manner of the seventh aspect or the second possible implementation manner of the seventh aspect, in a third possible implementation manner of the seventh aspect, the uplink positioning reference signal is specifically one or any combination of the following:

a service channel or control channel signal sent by the UE to the network side device;

a reference signal used for measurement or channel estimation and sent by the UE to the network side device; and a specially defined uplink positioning reference signal used for detection by the positioning node.

An eighth aspect of this application provides a positioning method, including:

receiving, by a network side device, a positioning request, where the positioning request is used to trigger positioning for user equipment UE; and sending configuration information to N positioning nodes according to the positioning request, where the configuration information is used to indicate information about the UE and/or information about an uplink positioning reference signal sent by the UE, the UE is located within a device coverage area of the network side device, the N positioning nodes are located within the device coverage area, and a node coverage area of each positioning node is a part of the device coverage area, where N is a positive integer greater than 1;

receiving, by the N positioning nodes according to the configuration information, the uplink positioning reference signal sent by the UE, and obtaining N measurement results according to the uplink positioning reference signal;

sending, by M positioning nodes of the N positioning nodes, M measurement results corresponding to the M positioning nodes to the network side device, where M is a positive integer less than or equal to N; and determining, by the network side device, a position of the UE according to the M measurement results.

One or more technical solutions provided in embodiments of this application have at least the following technical effects or advantages:

In the embodiments of this application, at least one positioning node is further deployed in a coverage area of a network side device, and each positioning node covers a smaller area. The positioning node receives, according to configuration information sent by the network side device, an uplink positioning reference signal sent by user equipment UE, obtains a measurement result according to the uplink positioning reference signal, and reports the measurement result to the network side device. The network side device determines, according to the measurement result reported by the positioning node, a coverage area of which positioning node the user equipment UE is located within. Therefore, in the positioning method in the embodiments of this application, smaller-range positioning can be obtained in the coverage area of the network side device, and therefore positioning precision is improved compared with that of conventional GPS positioning and macro cellular network positioning. Further, various precision requirements can be satisfied by changing a size of a coverage area of a positioning node, so that network deployment can be flexibly performed according to an actual precision requirement.

DESCRIPTION OF EMBODIMENTS

Figure 1:
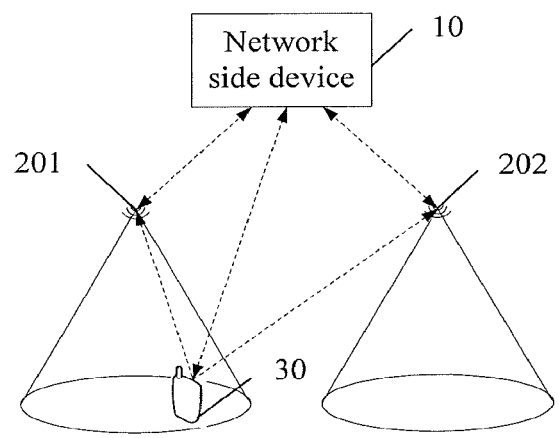
FIG. 1 is a schematic structural diagram of a positioning system according to an embodiment of this application.

Embodiments of this application provide a positioning method, a network side device (network device), a positioning node (positioning node device), and a positioning system, which are used to resolve a technical problem of low positioning precision in the prior art.

To resolve the foregoing technical problem, a general idea of technical solutions in the embodiments of this application is as follows:

In the embodiments of this application, at least one positioning node is further deployed in a coverage area of a network side device, and each positioning node covers a smaller area. The positioning node receives, according to configuration information sent by the network side device, an uplink positioning reference signal sent by user equipment UE, obtains a measurement result according to the uplink positioning reference signal, and reports the measurement result to the network side device. The network side device determines, according to the measurement result reported by the positioning node, a coverage area of which positioning node the user equipment UE is located within. Therefore, in the positioning method in the embodiments of this application, smaller-range positioning can be obtained in the coverage area of the network side device, and therefore positioning precision is improved compared with that of conventional GPS positioning and macro cellular network positioning. Further, various precision requirements can be satisfied by changing a size of a coverage area of a positioning node, so that network deployment can be flexibly performed according to an actual precision requirement.

To make the objectives, technical solutions, and advantages of the embodiments of this application clearer, the following clearly describes the technical solutions in the embodiments of this application with reference to the accompanying drawings in the embodiments of this application. Apparently, the described embodiments are merely a part rather than all of the embodiments of this application. All other embodiments obtained by a person of ordinary skill in the art according to the embodiments of this application without creative efforts shall fall within the protection scope of this application.

Various aspects are described in this specification with reference to user equipment, a network side device, and a positioning node.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a Session Initiation Protocol (SIP) phone, a wireless local loop (WLL) station, a personal digital assistant (PDA), or a meter having a function of automatically reading water/electricity/gas. The wireless terminal may also be referred to as a system, a subscriber unit, a subscriber station, a mobile station, a mobile terminal (Mobile), a remote station, an access point, a remote terminal, an access terminal, a user terminal, a user agent, a user device, or user equipment.

The network side device is specifically a base station, a Wi-Fi access point, a base station controller, a positioning server integrated in a base station, or a positioning server connected to a base station. The base station (for example, an access point) may refer to a device, in an access network, that communicates with a wireless terminal via one or more sectors over an air interface. The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface. For example, the base station may be a base station (Base Transceiver Station, BTS) in GSM, or may be a base station (NodeB) in UMTS, or may be an evolved NodeB (NodeB, eNB or e-NodeB, evolved Node B) in LTE or LTE-A. The base station may be specifically an outdoor deployed macro base station (Macro) or micro base station (Micro), or a small cell (Pico or pRRU) deployed indoors, which is not limited in this application. The base station controller may be a base station controller (BSC) in CDMA, or a radio network controller (RNC) in WCDMA, which is not limited in this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the following, the preferable implementation manners of this application are described in detail with reference to the accompanying drawings.

Embodiment 1

Figure 2:
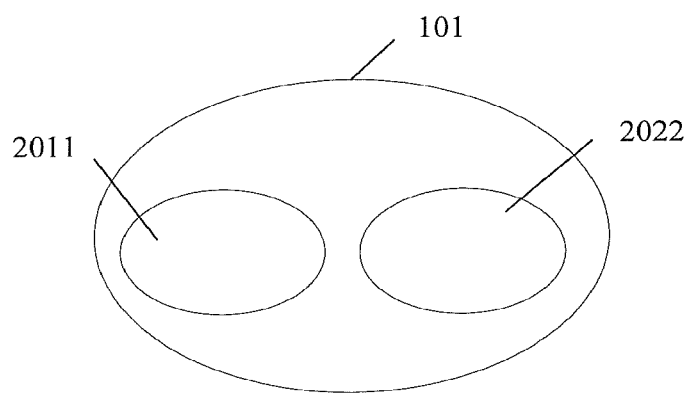
FIG. 2 is a schematic diagram of a relationship between a coverage area of a network side device and a coverage area of a positioning node according to an embodiment of this application.

This embodiment provides a positioning system. Referring to FIG. 1, the positioning system includes a network side device 10 and N positioning nodes, where N is a positive integer greater than 1. FIG. 1 shows only two positioning nodes: a positioning node 201 and a positioning node 202. The N positioning nodes are located within a device coverage area of the network side device 10, and a node coverage area of each positioning node is a part of the device coverage area. Preferably, any two of node coverage areas of the N positioning nodes are not the same, that is, the node coverage areas may come in contact with each other, or may intersect but not completely overlap with each other, or may not come in contact with each other at all. As shown in FIG. 2, the device coverage area of the network side device 10 is an area 101, a node coverage area of the positioning node 201 is an area 2011, and a node coverage area of the positioning node 202 is an area 2022. Both the area 2011 and the area 2022 are within the area 101 and cover a part of the area 101; the area 2011 and the area 2022 do not intersect at all.

Continuing to refer to FIG. 1, user equipment UE 30 is located within the device coverage area of the network side device 10, and due to a requirement such as transportation navigation or position information sharing, the user equipment 30 may send a positioning request to the network side device 10. Alternatively, another network side device triggers positioning for the user equipment UE. For example, when the UE 30 logs into a social network client, WeChat for example, and a social network server needs to provide position information for the UE, the social network server may initiate a positioning request to the network side device 10 for the UE. Then the network side device 10 may start a positioning process. Specifically, the network side device 10 is configured to receive a positioning request, where the positioning request is used to trigger positioning for the user equipment UE 30. For example, the positioning request is sent by the user equipment UE 30, or sent by another network side device. The network side device 10 is further configured to send configuration information to the N positioning nodes according to the positioning request, where the configuration information is used to indicate information about the UE 30 and/or information about an uplink positioning reference signal sent by the UE 30.

The N positioning nodes are configured to receive, according to the configuration information, the uplink positioning reference signal sent by the UE 30, and obtain N measurement results according to the uplink positioning reference signal, where M positioning nodes of the N positioning nodes send M measurement results corresponding to the M positioning nodes to the network side device 10, and M is a positive integer less than or equal to N. The network side device 10 is further configured to determine a position of the UE 30 according to the M measurement results. For example, a node coverage area in which the UE 30 is located is used as the position of the UE 30. Further, the network side device 10 is further configured to send the determined position to the UE 30 or the another network side device. If the determined position is sent to the another network side device, the another network side device may further send the determined position to the UE 30 or another user equipment.

Figure 3:
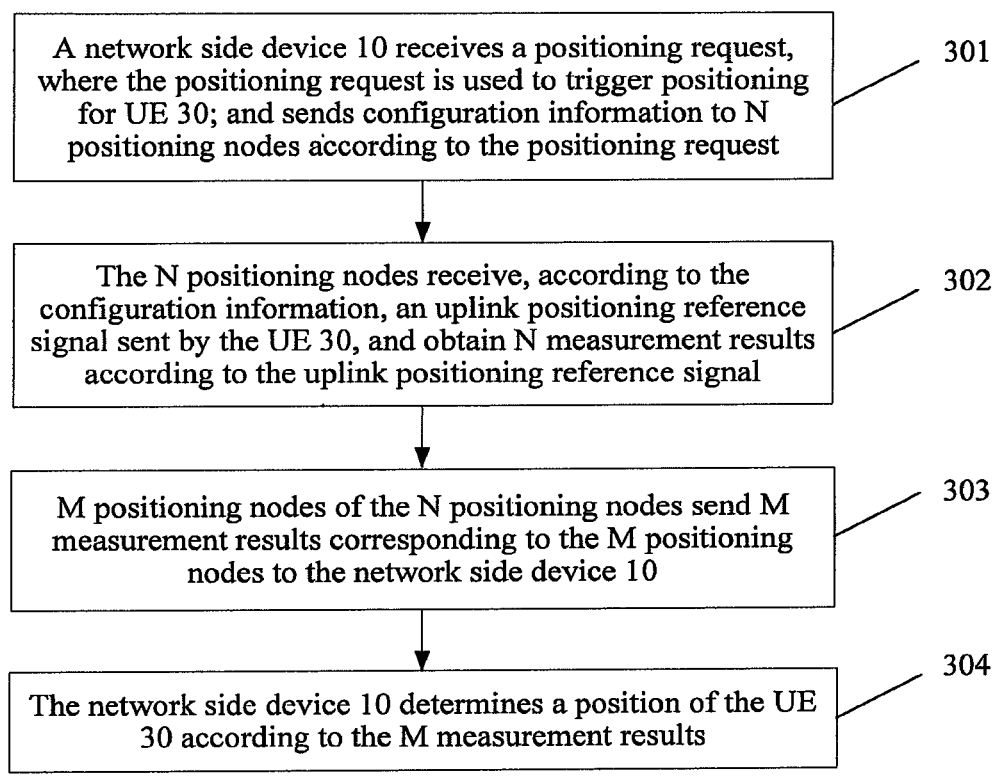
FIG. 3 is a flowchart of a positioning method of a positioning system according to Embodiment 1 of this application.

Refer to FIG. 3 together, which is a flowchart of a positioning method according to the positioning system, where the positioning method includes:

Step 301: The network side device 10 receives a positioning request, where the positioning request is used to trigger positioning for the UE 30; and sends configuration information to the N positioning nodes according to the positioning request, where the positioning request may be sent by the user equipment UE 30, or may be sent by another network side device, and the configuration information is used to indicate information about the UE 30 and/or information about an uplink positioning reference signal sent by the UE 30.

Step 302: The N positioning nodes receive, according to the configuration information, the uplink positioning reference signal sent by the UE 30, and obtain N measurement results according to the uplink positioning reference signal.

Step 303: M positioning nodes of the N positioning nodes send M measurement results corresponding to the M positioning nodes to the network side device 10.

Step 304: The network side device 10 determines a position of the UE 30 according to the M measurement results. For example, a node coverage area in which the UE 30 is located is determined as the position of the UE 30.

Further, the network side device 10 further sends a determined position to the UE 30 or the another network side device.

In step 301, because the UE 30 has a positioning requirement, the UE 30 sends a positioning request, and the network side device 10 receives the positioning request sent by the UE 30. When another server, a social network server for example, also needs to position the UE 30, the server may also send a positioning request to the network side device 10. Then the network side device 10 sends the configuration information to the N positioning nodes in the device coverage area according to the positioning request, where the configuration information may include an identifier of the UE 30 and/or transmission configuration of the uplink positioning reference signal sent by the UE 30, for example, a location of a time-frequency resource, a used code sequence, and a transmit power. The identifier of the UE 30 is used to uniquely identify the UE 30 globally or within a specific scope. In this way, the positioning node learns where to receive the uplink positioning reference signal sent by the UE 30.

For example, the uplink positioning reference signal may be specifically: a service channel or control channel signal sent by the UE 30 to the network side device 10, a reference signal used for measurement or channel estimation and sent by the UE 30 to the network side device 10, or a specially defined uplink positioning reference signal used for detection by the positioning node.

When the uplink positioning reference signal is specifically the service channel or control channel signal sent to the network side device 10 or the reference signal used for measurement or channel estimation and sent by the UE 30 to the network side device 10, resource scheduling of the UE 30 is determined by a communication requirement between the UE 30 and the network side device 10, and whether the UE 30 requests for positioning is irrelevant to resource scheduling of the UE 30. Therefore, it is possible that before the N positioning nodes receive the configuration information, signal sending of the UE 30 has already been configured, and in this case, the network side device 10 does not need to send the configuration information to the UE again. However, when the uplink positioning reference signal is specifically the specially defined uplink positioning reference signal used for detection by the positioning node, the network side device 10 further needs to send same configuration information to the UE 30. Therefore, in conclusion, before the N positioning nodes receive the configuration information, if the UE 30 does not receive the same configuration information, the network side device 10 further sends the same configuration information to the UE 30.

Then, the UE 30 sends the uplink positioning reference signal according to the received configuration information; therefore, in step 302, the N positioning nodes receive, according to the configuration information, the uplink positioning reference signal sent by the UE 30, and obtain the N measurement results according to the uplink positioning reference signal. There are specifically multiple implementation manners of obtaining the N measurement results according to the uplink positioning reference signal. In a first implementation manner, the positioning node detects a received signal power of the uplink positioning reference signal, and determines whether the power exceeds a predetermined power threshold; when the power exceeds the predetermined power threshold, it indicates that the UE 30 is located within a node coverage area of the positioning node; otherwise, it indicates that the UE 30 is not located within the node coverage area of the positioning node. Therefore, in this case, the measurement result may be specifically a result indicating whether the UE 30 is located or not located within the node coverage area of the positioning node. In a second implementation manner, that is, a detected received signal power is directly used as the measurement result.

Subsequently, step 303 is performed, that is, the M measurement results corresponding to the M positioning nodes of the N positioning nodes are sent to the network side device 10. In practical application, the M positioning nodes for reporting the measurement results change with the measurement results. For example, when the measurement results are results indicating that the UE 30 is located or not located within the node coverage area of the positioning node, only a positioning node whose measurement result is "yes" sends the measurement result to the network side device 10. Referring to FIG. 1 and FIG. 2, it is assumed that a measurement result of the positioning node 201 is yes, that is, the UE 30 is located within the node coverage area 2011 of the positioning node 201, while a measurement result of the positioning node 202 is no, that is, the UE 30 is not located within the node coverage area 2022 of the positioning node 202. Then the positioning node 201 sends the measurement result "yes", or represented by using another symbol, "1" for example, to the network side device 10, while the positioning node 202 does not send the measurement result.

For another example, when the measurement result is the received signal power of the uplink positioning reference signal, all the N positioning nodes send received signal powers measured by the N positioning nodes to the network side device; or only a positioning node whose received signal power exceeds the predetermined power threshold sends the received signal power measured by the positioning node to the network side device 10, while a positioning node whose received signal power does not exceed the predetermined power threshold does not send the measurement result.

Subsequently, step 304 is performed, that is, the network side device 10 determines, according to the M measurement results, a node coverage area in which the UE 30 is located, and uses the node coverage area in which the UE 30 is located as the position of the UE 30.

Further, the network side device further sends the determined position to the UE 30 or the another network side device. If the determined position is sent to the another network side device, the another network side device further sends the determined position to the UE 30 or another user equipment.

Similarly, according to different received measurement results, there may be different implementation manners of determining, by the network side device 10, the position of the UE according to the M measurement results. For example, for the foregoing first measurement result, because the measurement result is a result indicating that the UE 30 is located within node coverage areas of the M positioning nodes, determining, by the network side device 10 according to the M measurement results, the node coverage area in which the UE 30 is located is specifically: determining, according to the M measurement results, that the node coverage area in which the UE 30 is located is an overlapping area of the node coverage areas of the M positioning nodes. In this embodiment, there are two cases: First, M is 1, that is, only one positioning node reports a measurement result, and therefore, it is determined that the UE 30 is located within a node coverage area of the positioning node. Because there is only one node coverage area, the overlapping area of the node coverage areas is the node coverage area itself. In this case, because a node coverage area of one positioning node is small, and a radius is generally less than 5 m, when the node coverage area is used as the position of the UE 30, positioning precision is relatively high. Second, M is greater than 1, that is, multiple positioning nodes report measurement results "yes", and therefore, it is determined that an overlapping area of node coverage areas of the multiple positioning nodes is the node coverage area in which the UE 30 is located. Further, the overlapping area is used as the position of the UE 30, and in this way, the positioning precision is higher.

For the another network side device, after receiving the position of the UE 30 sent by the network side device 10, the another network side device may send the position of the UE 30 to the UE 30, so that the position of the UE 30 is displayed on the client of the social network. The position of the UE 30 may also be sent to the another user equipment.

When the measurement result is the received signal power, determining, by the network side device 10 according to the M measurement results, the node coverage area in which the UE 30 is located is specifically: determining, according to the M received signal powers and by calculating distances from the UE 30 to the M positioning nodes, the node coverage area in which the UE is located.

Similarly, in this embodiment, there are three cases: First, M is 1, that is, only one positioning node reports a measurement result, and a propagation distance of the uplink positioning reference signal is calculated according to a difference between the received signal power and a transmit signal power of the UE, where the distance is a distance between the UE 30 and the positioning node. Further positioning may be implemented in a node coverage area of the positioning node. For example, a radius of the node coverage area of the positioning node is 5 m; however, it is determined through calculation that the distance between the UE 30 and the positioning node is 2 m, and it may be determined that an area of a 2 m radius in the node coverage area is the position of the UE 30.

Second, M is greater than 1, that is, multiple positioning nodes report received signal powers, and the reported received signal powers are greater than the predetermined power threshold. This means that the UE 30 is simultaneously located within node coverage areas of the multiple positioning nodes, that is, the UE 30 is located within an overlapping area of the node coverage areas of the multiple positioning nodes. Then, the position of the UE 30 may further be narrowed in the overlapping area by separately calculating distances from the UE 30 to each positioning node. Therefore, the positioning precision is higher.

Third, M is equal to N, that is, all the positioning nodes report received signal powers, and some of the reported received signal powers exceed the predetermined power threshold, while the rest does not exceed the predetermined power threshold. Therefore, the network side device 10 first performs determining, then may only consider the received signal powers that exceed the predetermined power threshold, and determines the position of the UE 30 according to the method described in the foregoing second case. Alternatively, the network side device 10 does not determine a relationship between the received signal powers and the predetermined power threshold, but selects first several positioning nodes whose received signal powers are the highest, and determines the position of the UE 30 with reference to distances from the UE 30 to the positioning nodes and an overlapping area of the several positioning nodes.

When the measurement result is the received signal power, determining, by the network side device 10 according to the M measurement results, the node coverage area in which the UE 30 is located is specifically: determining a node coverage area of a positioning node corresponding to a highest received signal power as the position of the UE 30. Specifically, the received signal powers are sorted to determine the highest received signal power, and the node coverage area of the positioning node corresponding to the highest received signal power is determined as the node coverage area in which the UE 30 is located. The received signal powers may be sent by some positioning nodes, or may be sent by all the positioning nodes; all the received signal powers may exceed the predetermined power threshold, or some received signal powers exceed the predetermined power threshold, while the rest does not exceed the predetermined power threshold.

After the position of the UE 30 is determined, the network side device 10 sends the determined position to the UE 30, and after the UE 30 receives the determined position, the position of the UE 30 may be displayed in an application, for example, a current position of the UE 30 is displayed on a navigation map by using an icon.

Further, in practical application, in step 302, the N positioning nodes further measure angles of arrival (AoA) from the uplink positioning reference signal sent by the UE 30 to the N positioning nodes, and the angles of arrival are also used as measurement results and reported to the network side device 10 in step 303. Then, in step 304, the network side device 10 may determine the position of the UE 30 with reference to the angles of arrival, to further narrow a range of the UE 30 in a node coverage area of a positioning node.

In the foregoing embodiments, the configuration information sent by the network side device 10 to the N positioning nodes, and the measurement results reported by the N positioning nodes to the network side device 10 may be specifically transmitted by using an air interface communications protocol, where the air interface communications protocol is, for example, an air interface communications protocol in a cellular communications system, or a WiFi or Bluetooth protocol. The air interface communications protocol in the cellular communications system is specifically, for example, an air interface communications protocol of a machine to machine (M2M) service, for example, an air interface communications protocol of low cost machine type communication (MTC) defined by 3GPP, such as air interface communications protocols in a Global System for Mobile Communications (GSM), a Universal Mobile Telecommunications System (UMTS), and a Long Term Evolution (LTE) system; for example, a general radio access network (GRAN) protocol in a GSM system.

Further, a data packet transmitted between the positioning node and the network side device 10 is relatively small, and therefore, high-rate and large-traffic transmission is not necessary. Therefore, transmission may be performed by using the air interface communications protocol of the M2M service, in a manner of WiFi or Bluetooth direct connection, or the like. Therefore, the positioning node is specifically a particular M2M terminal, for example, an M2M terminal in a cellular network or a wireless local area network may be used as a positioning node when a function and a module (which may include an antenna, a radio frequency perception component, and the like) for receiving and detecting the uplink positioning reference signal of the UE are added to the M2M terminal.

Between the positioning node and the UE 30, the positioning node receives the uplink positioning reference signal according to a communications protocol used by the UE 30 and the network side device 10.

In another embodiment, the positioning node may also be a terminal, in the cellular network, that has a device to device (D2D) communications function. Then, communication between the network side device 10 and the positioning node is performed by using an uplink and downlink air interface communications protocol of a cellular system; between the positioning node and the UE 30, the positioning node may measure, in a D2D communication manner, the uplink positioning reference signal transmitted by the UE. Certainly, in this embodiment, the positioning node may receive the uplink positioning reference signal according to the communications protocol used by the UE 30 and the network side device 10.

In this embodiment of this application, because an air interface communications protocol is used between the network side device 10 and the positioning node, deployment of the positioning node is extremely flexible, and deployment complexity is greatly reduced. Further, in this embodiment of this application, all communication between network elements reuses an existing communications standard, which does not affect the UE; implementation of the positioning node is simple and of low costs, and few modifications are made on the network side. Still further, if an M2M terminal is used as a positioning node, because the M2M terminal is specially designed for small data packet transmission, device costs are reduced, and power consumption is low.

There may be multiple solutions to power supply of the positioning node:

First, the positioning node is deployed near a power interface, for example, near an existing socket or inside a lighting box.

Second, wireless charging: the positioning node is charged through continuous induction of space electromagnetic signals by using a wireless charging technology.

Third, the positioning node is charged by using solar energy and visible light.

Fourth, a battery of the positioning node is manually replaced; the network side device 10 may obtain transmit power headroom report (PHR) of the positioning node, and determine whether the battery needs to be replaced.

Figure 4:
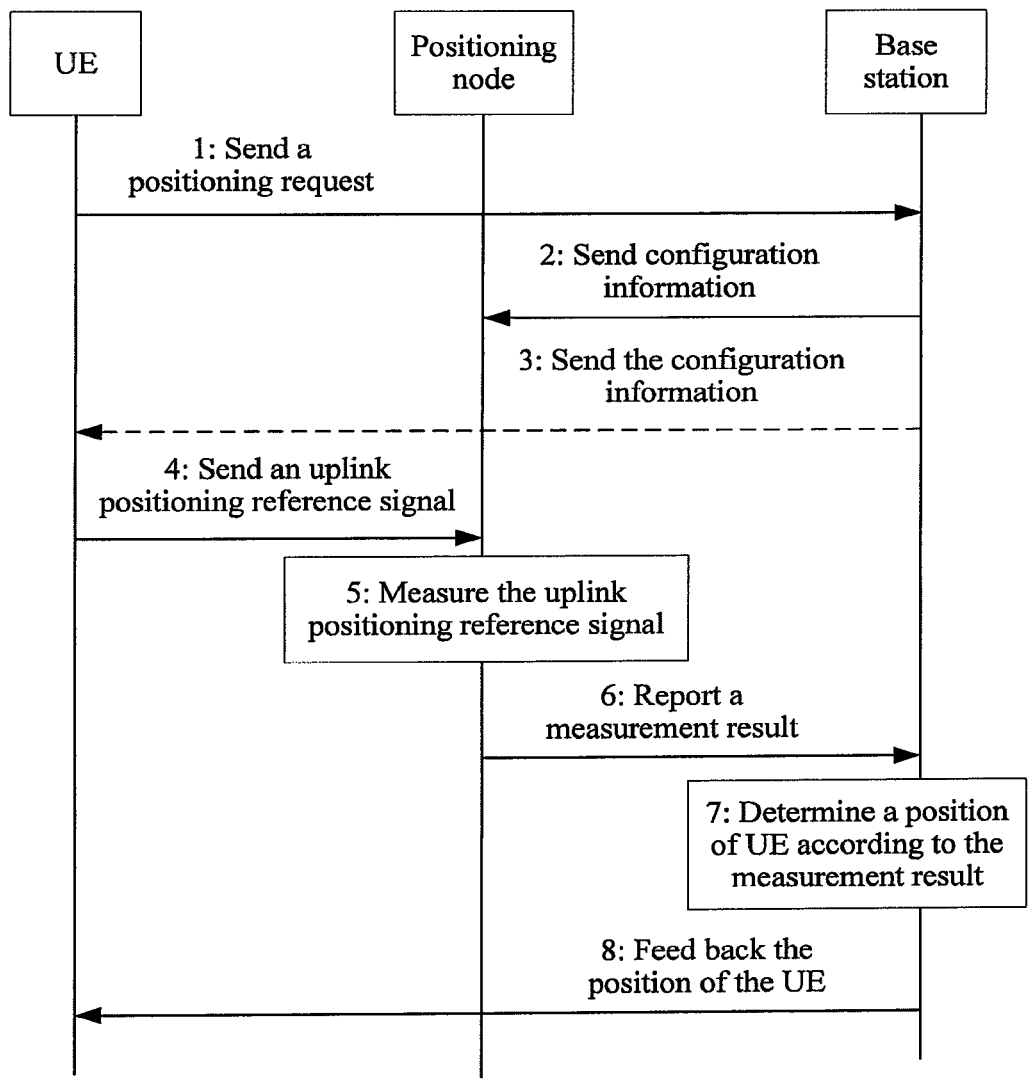
FIG. 4 is a schematic diagram of interaction between network elements in a positioning method according to Embodiment 1 of this application.

Next, refer to FIG. 4, which is a specific example of a positioning method according to a cellular network in this embodiment. A positioning request is triggered by the UE 30, and an example of the network side device 10 is a base station. The positioning method includes:

Step 1: UE sends a positioning request to the base station, for example, when a user corresponding to the UE is posting a microblog message, the user selects "insert position", and in this case, the UE sends a positioning request to the base station.

Step 2: After receiving the positioning request, the base station sends configuration information to a positioning node, where the configuration information includes an only identifier of the UE, and transmission configuration of an uplink positioning reference signal sent by the UE.

Step 3: The base station sends the transmission configuration of the uplink positioning reference signal to the UE, where this step is optional, because if the uplink positioning reference signal is specifically a service channel or control channel signal, a reference signal for measurement or channel estimation, or the like sent by the UE to the base station but not a signal dedicated to detection by the positioning node, resource scheduling of the UE is determined by a communication requirement between the UE and the base station; therefore, it is possible that signal sending of the UE has already been configured before the positioning node receives the configuration information, and the base station does not need to send the configuration information to the UE again; in other words, step 3 is not necessarily performed in every positioning process.

Step 4: The UE sends the uplink positioning reference signal to the positioning node; specifically, the UE sends the uplink positioning reference signal according to the transmission configuration sent by the base station.

Step 5: The positioning node receives the uplink positioning reference signal according to the configuration information, and measures the uplink positioning reference signal; for example, the positioning node measures a received signal power and/or an angle of arrival of the received uplink positioning reference signal.

Step 6: The positioning node reports a measurement result to the base station; specifically for example, the positioning node reports the measurement result to the base station by using an air interface communications protocol.

Step 7: The base station determines a position of the UE according to the measurement result, and a specific determined position is a node coverage area of a positioning node, or an overlapping area of node coverage areas of several positioning nodes.

Step 8: The base station feeds back the position of the UE to the UE, and the position of the UE can be displayed on the UE; for example, the position of the user "XX shopping mall second floor XX restaurant" is displayed on an interface on which a new microblog message is being written.

After step 1 and before step 3, the base station further sends triggering information to the positioning node, to trigger positioning measurement, and only in this case, the positioning node enters a positioning measurement process; correspondingly, after step 8, the base station further sends disabling information to the positioning node, to disable positioning measurement. Therefore, by using the method in this embodiment, the positioning node may enter a hibernation state when there is no measurement task, and the base station wakens the positioning node when there is a measurement task, thereby reducing power consumption of the positioning node.

Embodiment 2

Figure 5:
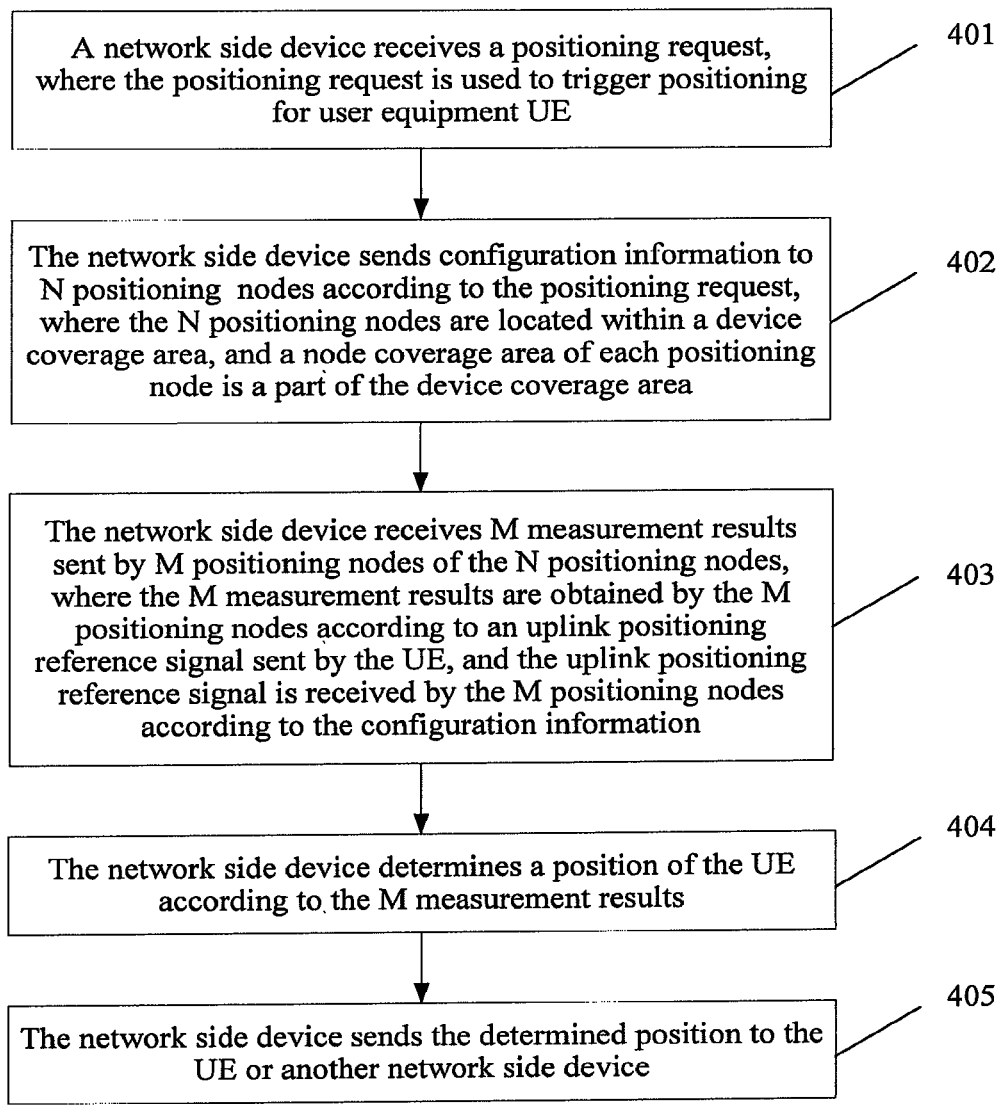
FIG. 5 is a flowchart of a positioning method on a network side device side according to Embodiment 2 of this application.

The foregoing describes the positioning method in the embodiment from a system interaction aspect. Embodiment 2 describes the positioning method on a single side, and first describes the positioning method from a perspective of a network side device. Referring to FIG. 5, the positioning method on a network side device side includes:

Step 401: The network side device receives a positioning request, where the positioning request is used to position UE, where the UE is located within a device coverage area of the network side device. The positioning request may be sent by the user equipment UE, or sent by another network side device.

Step 402: The network side device sends configuration information to N positioning nodes according to the positioning request, where the N positioning nodes are located within the device coverage area, a node coverage area of each positioning node is a part of the device coverage area, and N is a positive integer greater than 1. The configuration information is used to indicate information about the UE and/or information about an uplink positioning reference signal sent by the UE.

Step 403: The network side device receives M measurement results sent by M positioning nodes of the N positioning nodes, where the M measurement results are obtained by the M positioning nodes according to the uplink positioning reference signal sent by the UE, the uplink positioning reference signal is received by the M positioning nodes according to the configuration information, and M is a positive integer less than or equal to N.

Step 404: The network side device determines a position of the UE according to the M measurement results. For example, the network side device determines which node coverage area the UE is located within, and uses the node coverage area in which the UE is located as the position of the UE.

Further, the method further includes step 405: the network side device sends a determined position to the UE or the another network side device.

Optionally, after step 401 and before step 402, the network side device further sends the configuration information to the UE, and allocates a resource to the UE for transmitting the uplink positioning reference signal.

Optionally, after step 401 and before step 402, the network side device further sends triggering information for triggering positioning measurement to the positioning node; correspondingly, after step 405, the network side device further sends disabling information for disabling positioning measurement to the positioning node. Therefore, by using the method in this embodiment, the positioning node may enter a hibernation state when there is no measurement task, and the network side device wakens the positioning node when there is a measurement task, thereby reducing power consumption of the positioning node.

In step 404, when the M measurement results are specifically results indicating that the UE is located within node coverage areas of the M positioning nodes, that the network side device determines a position of the UE according to the M measurement results is specifically: when M is greater than 1, determining an overlapping area of the node coverage areas of the M positioning nodes as the position of the UE; or when M is equal to 1, determining the node coverage area of the M positioning node as the position of the UE.

When the M measurement results are specifically received signal powers of the uplink positioning reference signal, that the network side device determines a position of the UE according to the M measurement results is specifically: determining the position of the UE by calculating distances from the UE to the M positioning nodes according to M received signal powers; or determining a node coverage area of a positioning node corresponding to a highest received signal power as the position of the UE.

Further, the network side device specifically determines a circular area as the position of the UE, where a center of the circular area is a position of a positioning node corresponding to a minimum distance, and a radius of the circular area is the minimum distance.

Further, step 402 is specifically: sending the configuration information to the N positioning nodes by using an air interface communications protocol; step 403 is specifically: the network side device receives, by using the air interface communications protocol, the M measurement results sent by the M positioning nodes of the N positioning nodes.

Specifically, the air interface communications protocol is specifically an air interface communications protocol in a cellular communications system; or a WiFi or Bluetooth protocol.

For a specific implementation manner on the network side device side, refer to description in the foregoing Embodiment 1; details are not described herein.

Embodiment 3

Figure 6:
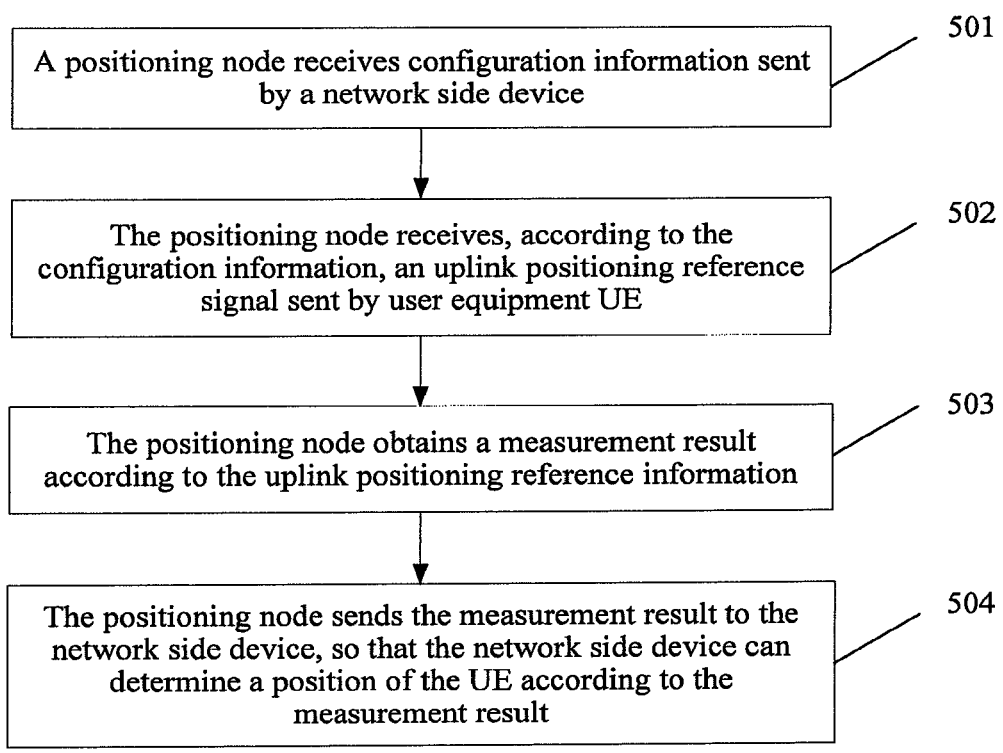
FIG. 6 is a schematic flowchart of a positioning method on a positioning node side according to Embodiment 3 of this application.

Embodiment 3 describes the positioning method from a perspective of a positioning node side. Referring to FIG. 6, the positioning method on the positioning node side includes:

Step 501: A positioning node receives configuration information sent by a network side device, where the positioning node is located within a device coverage area of the network side device, and a node coverage area of the positioning node is a part of the device coverage area. The configuration information is used to indicate information about user equipment UE and/or information about an uplink positioning reference signal sent by the UE.

Step 502: The positioning node receives, according to the configuration information, the uplink positioning reference signal sent by the UE, where the UE is located within the device coverage area.

Step 503: The positioning node obtains a measurement result according to the uplink positioning reference information.

Step 504: The positioning node sends the measurement result to the network side device, so that the network side device can determine a position of the UE according to the measurement result.

Optionally, before step 501, the positioning node further receives triggering information sent by the network side device, and triggers a positioning measurement function; correspondingly, after step 504, the positioning node further receives disabling information sent by the network side device, and disables the positioning measurement function.

Further, step 501 is specifically: the positioning node receives, by using an air interface communications protocol, the configuration information sent by the network side device; step 504 is specifically: the positioning node sends the measurement result to the network side device by using the air interface communications protocol.

Specifically, the air interface communications protocol is specifically an air interface communications protocol in a cellular communications system; or a WiFi or Bluetooth protocol.

Optionally, step 502 specifically includes: the positioning node receives, according to the configuration information and a communications protocol used by the UE and the network side device or a device to device D2D protocol, the uplink positioning reference signal sent by the user equipment UE.

Optionally, the measurement result obtained in step 503 may be specifically a result indicating that the UE is located within the node coverage area of the positioning node, or may be a received signal power of the uplink positioning reference signal. Then, the sending the measurement result to the network side device in step 504 may be specifically: sending the result indicating that the UE is located within the node coverage area of the positioning node, for example "yes"; or may be sending the received signal power directly; or may be sending the received signal power when the received signal power exceeds a predetermined power threshold.

For a specific implementation manner on the positioning node side, refer to description in the foregoing Embodiment 1; details are not described herein.

Embodiment 4

Figure 7:
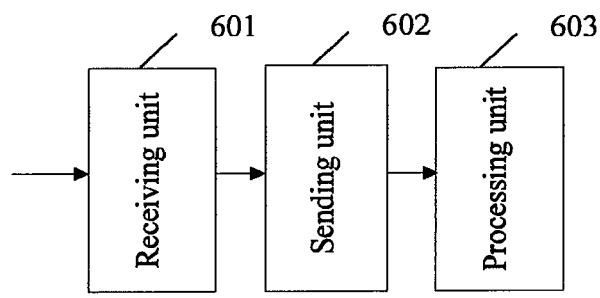
FIG. 7 is a function block diagram of a network side device according to Embodiment 4 of this application.

This embodiment of this application further provides a network side device. Referring to FIG. 7, FIG. 7 is a function block diagram of the network side device in this embodiment, and units in FIG. 7 are arranged according to a processing sequence in a positioning process. The network side device includes: a receiving unit 601, configured to receive a positioning request, where the positioning request is used to trigger positioning for user equipment UE, and the UE is located within a device coverage area of the network side device; a sending unit (transmitting unit) 602, configured to send configuration information to N positioning nodes after the receiving unit 601 receives the positioning request, where the configuration information is used to indicate information about the UE and/or information about an uplink positioning reference signal sent by the UE, the N positioning nodes are located within the device coverage area, and a node coverage area of each positioning node is a part of the device coverage area, where N is a positive integer greater than 1; the receiving unit 601 is further configured to receive M measurement results sent by M positioning nodes of the N positioning nodes, where the M measurement results are obtained by the M positioning nodes according to the uplink positioning reference signal sent by the UE, the uplink positioning reference signal is received by the M positioning nodes according to the configuration information, and M is a positive integer less than or equal to N; and a processing unit 603, configured to determine a position of the UE according to the M measurement results.

Optionally, the positioning request is specifically sent by the user equipment UE, or sent by another network side device.

Optionally, the sending unit 602 is further configured to send the determined position to the UE or the another network side device.

Further, the processing unit 603 is specifically configured to determine an overlapping area of the node coverage areas of the M positioning nodes as the position of the UE when the M measurement results are specifically results indicating that the UE is located within node coverage areas of the M positioning nodes, and when M is greater than 1; or determine the node coverage area of the M positioning node as the position of the UE when M is equal to 1.

Further, the processing unit 603 is specifically configured to: when the M measurement results are specifically received signal powers of the uplink positioning reference signal, determine the position of the UE by calculating distances from the UE to the M positioning nodes according to M received signal powers; or determine a node coverage area of a positioning node corresponding to a highest received signal power as the position of the UE.

Further, the processing unit 603 is specifically configured to determine a circular area as the position of the UE, where a center of the circular area is a position of a positioning node corresponding to a minimum distance, and a radius of the circular area is the minimum distance.

With reference to the foregoing embodiments, the sending unit 602 is specifically configured to send the configuration information to the N positioning nodes by using an air interface communications protocol; the receiving unit 601 is specifically configured to receive the M measurement results by using the air interface communications protocol.

Specifically, the air interface communications protocol is specifically an air interface communications protocol in a cellular communications system; or a WiFi or Bluetooth protocol.

With reference to the foregoing embodiments, the network side device is specifically a base station, a Wi-Fi access point, a base station controller, a positioning server integrated in a base station, or a positioning server connected to a base station.

In practical application, the receiving unit 601 and the sending unit 602 may be integrated together, or may be two physically independent units. The receiving unit 601 may be one module configured to support multiple communications modes, or may include multiple receiving modules that support different communications modes separately. The sending unit 602 is similar to the receiving unit 601.

Various variations and specific instances of the positioning methods in the foregoing embodiments of FIG. 3 to FIG. 5 are also applicable to the network side device in this embodiment. With the foregoing detailed description of the positioning methods, a person skilled in the art may clearly understand the implementation method of the network side device in this embodiment. Therefore, for brevity of the specification, details are not described herein.

Embodiment 5

Figure 8:
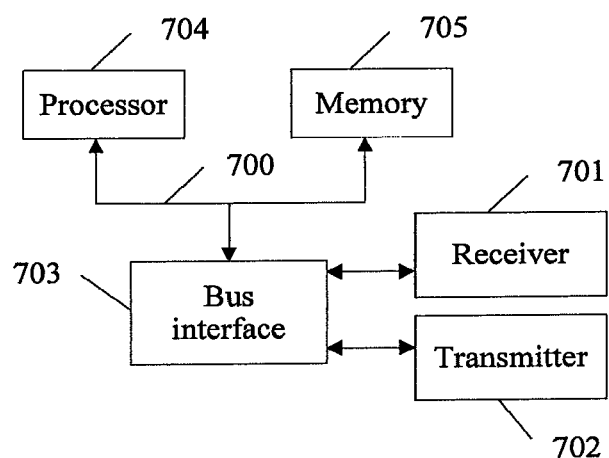
FIG. 8 is a concept diagram of an instance of hardware implementation of a network side device according to Embodiment 5 of this application.

This embodiment further provides a network side device. Referring to FIG. 8, FIG. 8 is a concept diagram of an instance of hardware implementation of the network side device. The network side device includes: a receiver 701, configured to receive a positioning request, where the positioning request is used to trigger positioning for user equipment UE, and the UE is located within a device coverage area of the network side device; a transmitter 702, configured to send configuration information to N positioning nodes after the receiver 701 receives the positioning request, where the configuration information is used to indicate information about the UE and/or information about an uplink positioning reference signal sent by the UE, the N positioning nodes are located within the device coverage area, and a node coverage area of each positioning node is a part of the device coverage area, where N is a positive integer greater than 1; the receiver 701 is further configured to receive M measurement results sent by M positioning nodes of the N positioning nodes, where the M measurement results are obtained by the M positioning nodes according to the uplink positioning reference signal sent by the UE, the uplink positioning reference signal is received by the M positioning nodes according to the configuration information, and M is a positive integer less than or equal to N; and a processor 704, configured to determine a position of the UE according to the M measurement results.

Optionally, the positioning request is specifically sent by the user equipment UE, or sent by another network side device.

Further, the transmitter 702 is further configured to send the determined position to the UE or the another network side device.

In FIG. 8, a bus architecture (indicated by using a bus 700): the bus 700 may include any quantity of interconnected buses and bridges, and the bus 700 connects various circuits of one or more processors represented by the processor 704 and one or more memories represented by a memory 705. The bus 700 may further connect various other circuits of a peripheral device, a voltage stabilizer, a power management circuit, and the like; this is well known in the art, and therefore is not further described in this specification. A bus interface 703 provides interfaces between the bus 700 and both of the receiver 701 and the transmitter 702. The receiver 701 and the transmitter 702 may be one component, that is, a transceiver, and the transceiver provides a unit configured to communicate with various other apparatuses on a transmission medium. The receiver 701 may be one module, for example, one chip configured to support various communications modes, or may include multiple receiving modules, for example, one chip group that supports different communications modes separately. The transmitter 702 is similar to the receiver 701. Data processed by the processor 704 may be transmitted on a wireless medium by using an antenna, and further, the antenna further receives data and sends the data to the processor 704.

The processor 704 is responsible for management of the bus 700 and general processing, and may further provide various functions, including timing, a peripheral interface, voltage adjustment, power supply management, and another control function. The memory 705 may be configured to store data used when the processor 704 performs an operation.

Further, the processor 704 is specifically configured to determine an overlapping area of the node coverage areas of the M positioning nodes as the position of the UE when the M measurement results are specifically results indicating that the UE is located within node coverage areas of the M positioning nodes, and when M is greater than 1; or determine the node coverage area of the M positioning node as the position of the UE when M is equal to 1.

Further, the processor 704 is specifically configured to: when the M measurement results are specifically received signal powers of the uplink positioning reference signal, determine the position of the UE by calculating distances from the UE to the M positioning nodes according to M received signal powers; or determine a node coverage area of a positioning node corresponding to a highest received signal power as the position of the UE.

Optionally, the processor 704 is specifically configured to determine a circular area as the position of the UE, where a center of the circular area is a position of a positioning node corresponding to a minimum distance, and a radius of the circular area is the minimum distance.

With reference to the foregoing embodiments, the transmitter 702 is specifically configured to send the configuration information to the N positioning nodes by using an air interface communications protocol; the receiver 701 is specifically configured to receive the M measurement results by using the air interface communications protocol.

Specifically, the air interface communications protocol is specifically an air interface communications protocol in a cellular communications system; or a WiFi or Bluetooth protocol.

With reference to the foregoing embodiments, the network side device is specifically a base station, a Wi-Fi access point, a base station controller, a positioning server integrated in a base station, or a positioning server connected to a base station.

Various variations and specific instances of the positioning methods in the foregoing embodiments of FIG. 3 to FIG. 5 are also applicable to the network side device in this embodiment. With the foregoing detailed description of the positioning methods, a person skilled in the art may clearly understand the implementation method of the network side device in this embodiment. Therefore, for brevity of the specification, details are not described herein.

Embodiment 6

Figure 9:
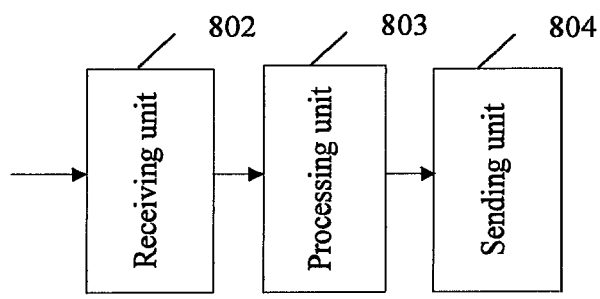
FIG. 9 is a function block diagram of a positioning node according to Embodiment 6 of this application.

This embodiment provides a positioning node. Referring to FIG. 9, FIG. 9 is a function block diagram of the positioning node. In FIG. 9, units are arranged according to a processing sequence in a positioning process. The positioning node includes: a receiving unit 802, configured to receive configuration information sent by a network side device, where the configuration information is used to indicate information about user equipment UE and/or information about an uplink positioning reference signal sent by the UE, the positioning node is located within a device coverage area of the network side device, and a node coverage area of the positioning node is a part of the device coverage area; the receiving unit 802 is further configured to receive, according to the configuration information, the uplink positioning reference signal sent by the UE, where the UE is located within the device coverage area; a processing unit 803, configured to obtain a measurement result according to the uplink positioning reference information; and a sending unit (transmitting unit) 804, configured to send the measurement result to the network side device, so that the network side device can determine a position of the UE according to the measurement result.

Optionally, the measurement result is specifically a result indicating that the UE is located within the node coverage area of the positioning node; or the measurement result is a received signal power of the uplink positioning reference signal.

Further, the receiving unit 802 is specifically configured to receive the configuration information by using an air interface communications protocol; the sending unit 804 is specifically configured to send the measurement result to the network side device by using the air interface communications protocol.

Specifically, the air interface communications protocol is specifically an air interface communications protocol in a cellular communications system; or a WiFi or Bluetooth protocol.

With reference to the foregoing embodiments, the positioning node is specifically a particular machine to machine M2M terminal; or the positioning node is specifically a terminal that supports a device to device D2D communications function.

With reference to the foregoing embodiments, the receiving unit 802 is specifically configured to receive, according to the configuration information and a communications protocol used by the UE and the network side device or a device to device D2D protocol, the uplink positioning reference signal sent by the user equipment UE.

In practical application, the receiving unit 802 and the sending unit 804 may be integrated together, or may be two physically independent units. The receiving unit 802 may be one module configured to support multiple communications modes, or may include multiple receiving modules that support different communications modes separately. The sending unit 804 is similar to the receiving unit 601.

Various variations and specific instances of the positioning methods in the foregoing embodiments of FIG. 3, FIG. 4, and FIG. 6 are also applicable to the positioning node in this embodiment. With the foregoing detailed description of the positioning methods, a person skilled in the art may clearly understand the implementation method of the positioning node in this embodiment. Therefore, for brevity of the specification, details are not described herein.

Embodiment 7

Figure 10:
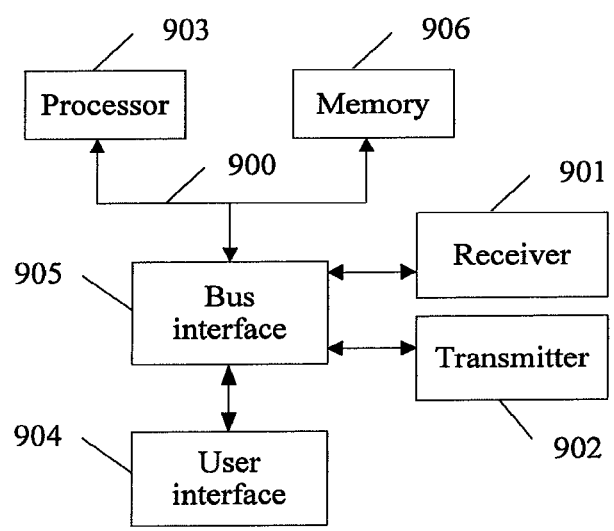
FIG. 10 is a concept diagram of an instance of hardware implementation of a positioning node according to Embodiment 7 of this application.

This embodiment provides a positioning node. Referring to FIG. 10, FIG. 10 is a block diagram of an instance of hardware implementation of the positioning node. The positioning node includes: a receiver 901, configured to receive configuration information sent by a network side device, where the configuration information is used to indicate information about user equipment UE and/or information about an uplink positioning reference signal sent by the UE, the positioning node is located within a device coverage area of the network side device, and a node coverage area of the positioning node is a part of the device coverage area; the receiver 901 is further configured to receive, according to the configuration information, the uplink positioning reference signal sent by the UE, where the UE is located within the device coverage area; a processor 903, configured to obtain a measurement result according to the uplink positioning reference information; and a transmitter 902, configured to send the measurement result to the network side device, so that the network side device can determine a position of the UE according to the measurement result.

In FIG. 10, a bus architecture (indicated by using a bus 900): the bus 900 may include any quantity of interconnected buses and bridges, and the bus 900 connects various circuits of one or more processors represented by the processor 903 and one or more memories represented by a memory 906. The bus 900 may further connect various other circuits of a peripheral device, a voltage stabilizer, a power management circuit, and the like; this is well known in the art, and therefore is not further described in this specification. A bus interface 905 provides interfaces between the bus 900 and both of the receiver 901 and the transmitter 902. The receiver 901 and the transmitter 902 may be one component, that is, a transceiver, and the transceiver provides a unit configured to communicate with various other apparatuses on a transmission medium. The receiver 901 may be one module, for example, one chip configured to support various communications modes, or may include multiple receiving modules, for example, one chip group that supports different communications modes separately. The transmitter 902 is similar to the receiver 901. Depending on nature of the user equipment, a user interface 904 may further be provided, for example, a keypad, a display, a loudspeaker, a microphone, and a joystick.

The processor 903 is responsible for management of the bus 900 and general processing, and the memory 906 may be configured to store data used when the processor 903 performs an operation.

Optionally, the measurement result is specifically a result indicating that the UE is located within the node coverage area of the positioning node; or the measurement result is a received signal power of the uplink positioning reference signal.

Further, the receiver 901 is specifically configured to receive the configuration information by using an air interface communications protocol; the transmitter 902 is specifically configured to send the measurement result to the network side device by using the air interface communications protocol.

Specifically, the air interface communications protocol is specifically an air interface communications protocol in a cellular communications system; or a WiFi or Bluetooth protocol.

With reference to the foregoing embodiments, the positioning node is specifically integrated in a machine to machine M2M terminal; or the positioning node is specifically a terminal that supports a device to device D2D communications function.

With reference to the foregoing embodiments, the receiver 901 is specifically configured to receive, according to the configuration information and a communications protocol used by the UE and the network side device or a device to device D2D protocol, the uplink positioning reference signal sent by the user equipment UE.

Various variations and specific instances of the positioning methods in the foregoing embodiments of FIG. 3, FIG. 4, and FIG. 6 are also applicable to the positioning node in this embodiment. With the foregoing detailed description of the positioning methods, a person skilled in the art may clearly understand the implementation method of the positioning node in this embodiment. Therefore, for brevity of the specification, details are not described herein.

It is noted that the various modules, submodules, units and components in the present disclosure can be implemented using any suitable technology. In an example, a module or a unit can be implemented using integrated circuit (IC). In another example, a module or a unit can be implemented as a processing circuit executing software instructions.

One or more technical solutions provided in embodiments of this application have at least the following technical effects or advantages:

In the embodiments of this application, at least one positioning node is further deployed in a coverage area of a network side device, and each positioning node covers a smaller area. The positioning node receives, according to configuration information sent by the network side device, an uplink positioning reference signal sent by user equipment UE, obtains a measurement result according to the uplink positioning reference signal, and reports the measurement result to the network side device. The network side device determines, according to the measurement result reported by the positioning node, a coverage area of which positioning node the user equipment UE is located within. Therefore, in the positioning method in the embodiments of this application, smaller-range positioning can be obtained in the coverage area of the network side device, and therefore positioning precision is improved compared with that of conventional GPS positioning and macro cellular network positioning. Further, various precision requirements can be satisfied by changing a size of a coverage area of a positioning node, so that network deployment can be flexibly performed according to an actual precision requirement.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A network device, comprising:
a transmitter configured to transmit configuration information to a plurality of positioning node devices in response to a positioning request to obtain a position of a user equipment (UE), wherein the configuration information includes information for an uplink positioning reference signal to be sent by the UE, wherein the plurality of positioning node devices are located within a first coverage area of the network device, and wherein at least one of the plurality of positioning node device is configured to cover a second coverage area that is within the first coverage area of the network device;
a receiver configured to receive measurement results sent by a subset of the plurality of positioning node devices, wherein the subset of the plurality of positioning node devices receive the uplink positioning reference signal sent by the UE according to the configuration information and obtain the measurement results based on the uplink positioning reference signal, and wherein each of the measurement results includes a received signal power of the uplink positioning reference signal; and
a processor configured to identify a first positioning node device from the plurality of positioning node devices that obtained the measurement result with a highest received signal power of the received signal powers included in the measurement results, and determine the position of the UE according to the measurement results by associating the position of the UE with a coverage area of the first positioning node device.

2. The network device according to claim 1, wherein the processor is further configured to associate an overlapping area of the second coverage areas of the subset of the positioning node devices with the position of the UE when the measurement results indicate that the UE is located within node coverage areas of the subset of the positioning node devices.

3. The network device according to claim 1, wherein the processor is further configured to calculate distances from the UE to the subset of the positioning node devices based on the received signal powers of the uplink positioning reference signal, and determine the position of the UE based on the distances.

4. The network device according to claim 3, wherein the processor is further configured to identify a positioning node device with a minimum distance to the UE, and determine a circular area with the minimum distance to the positioning node device as the position of the UE.

5. The network device according to claim 1, wherein the configuration information comprises an identifier of the UE and/or transmission configuration of the uplink positioning reference signal sent by the UE.

6. The network device according to claim 1, wherein the uplink positioning reference signal includes at least one of:
a service channel signal sent by the UE to the network device;
a control channel signal sent by the UE to the network device;
a reference signal used for measurement or channel estimation and sent by the UE to the network device; and
a specially defined uplink positioning reference signal used for detection by the positioning node device.

7. A positioning method, comprising:
receiving, by a network device, a positioning request to obtain a position of a user equipment (UE);
transmitting, by the network device, configuration information to a plurality of positioning node devices in response the positioning request, wherein the configuration information includes information for an uplink positioning reference signal to be sent by the UE, wherein the plurality of positioning node devices are located within a first coverage area of the network device, and wherein at least one of the plurality of positioning node device is configured to cover a second coverage area that is within the first coverage area;
receiving, by the network device, measurement results sent by a subset of the plurality of positioning node devices, wherein the subset of the plurality of positioning node devices receive the uplink positioning reference signal sent by the UE according to the configuration information and obtain the measurement results based on the uplink positioning reference signal, and wherein each of the measurement results includes a received signal power of the uplink positioning reference signal; and
identify, by the network device, a first positioning node device from the plurality of positioning node devices that obtained the measurement result with a highest received signal power of the received signal powers included in the measurement results, and determine the position of the UE according to the measurement results by associating the position of the UE with a coverage area of the first positioning node device.

8. The positioning method according to claim 7, wherein determining, by the network device, the position of the UE according to the measurement results comprises:
associating an overlapping area of the second coverage areas of the subset of the positioning node devices with the position of the UE.

9. The positioning method according to claim 7, wherein determining, by the network device, the position of the UE according to the measurement results comprises determining the position of the UE by calculating distances from the UE to the subset of the positioning node devices according to the received signal powers of the uplink positioning reference signal.

10. The positioning method according to claim 7, wherein the measurement results include received signal powers of the uplink positioning reference signal, and the method comprises:
calculating distances from the UE to the subset of the positioning node devices according to the received signal powers;
identifying a positioning node device with a minimum distance to the UE; and
determining a circular area with the minimum distance to the positioning node device as the position of the UE.

11. The positioning method according to claim 7, wherein the configuration information comprises an identifier of the UE and/or transmission configuration of the uplink positioning reference signal sent by the UE.

12. The positioning method according to claim 7, wherein the uplink positioning reference signal is at least one of:
- a service channel signal sent by the UE to the network device;
- a control channel signal sent by the UE to the network device;
- a reference signal used for measurement or channel estimation and sent by the UE to the network device; and
- a specially defined uplink positioning reference signal used for detection by the positioning node.

* * * * *